United States Patent
Osawa et al.

(10) Patent No.: US 8,743,370 B2
(45) Date of Patent: Jun. 3, 2014

(54) INTERFEROMETER INCLUDING ELEMENTS THAT REFLECT BEAMS MOVED IN PARALLEL IN A DIRECTION SUBSTANTIALLY PERPENDICULAR TO A SUBSTRATE BY REFLECTION

(75) Inventors: Kentaro Osawa, Kokubunji (JP); Hideharu Mikami, Kawasaki (JP)

(73) Assignee: Oclaro Japan, Inc., Kanagawa (JP)

( * ) Notice: Subject to any disclaimer, the term of this patent is extended or adjusted under 35 U.S.C. 154(b) by 59 days.

(21) Appl. No.: 13/348,954

(22) Filed: Jan. 12, 2012

(65) Prior Publication Data
US 2012/0182559 A1     Jul. 19, 2012

(30) Foreign Application Priority Data

Jan. 17, 2011 (JP) ................................. 2011-007331

(51) Int. Cl.
  *G01B 9/02* (2006.01)
  *G02F 2/00* (2006.01)
  *H04B 10/08* (2006.01)
  *H04B 17/00* (2006.01)

(52) U.S. Cl.
  USPC .............................. 356/450; 398/25; 359/325

(58) Field of Classification Search
  USPC .................. 356/455, 477–483; 359/834, 836; 427/163.4
  See application file for complete search history.

(56) References Cited

U.S. PATENT DOCUMENTS

| | | | |
|---|---|---|---|
| 7,035,025 B2 * | 4/2006 | Prince et al. | 359/831 |
| 8,172,412 B2 * | 5/2012 | Solyar et al. | 359/872 |
| 2003/0151749 A1 * | 8/2003 | Kim et al. | 356/512 |
| 2003/0164948 A1 | 9/2003 | Hill | |
| 2007/0097378 A1 * | 5/2007 | Kauppinen | 356/498 |
| 2008/0085121 A1 * | 4/2008 | Tomaru | 398/138 |
| 2010/0329667 A1 * | 12/2010 | Mikami | 398/9 |

FOREIGN PATENT DOCUMENTS

| | | |
|---|---|---|
| JP | 2005-525539 A | 8/2005 |
| JP | 2006-053049 A | 2/2006 |

* cited by examiner

*Primary Examiner* — Tarifur Chowdhury
*Assistant Examiner* — Willie Merrell, II
(74) *Attorney, Agent, or Firm* — Mattingly & Malur, PC

(57) ABSTRACT

A delay interferometer includes a half beam splitter and two pentagonal prisms disposed on a substrate. The half beam splitter branches light to be measured which travels substantially in parallel with the substrate into two branched light beams. The pentagonal prisms respectively reflect the respective branched light beams such that the optical axes of the branched light beams are moved in parallel in a direction substantially perpendicular to the substrate by reflection. The half beam splitter combines the branched light beams reflected by the pentagonal prisms to generate interference light beams.

3 Claims, 7 Drawing Sheets

INTERFEROMETER INCLUDING ELEMENTS THAT REFLECT BEAMS MOVED IN PARALLEL IN A DIRECTION SUBSTANTIALLY PERPENDICULAR TO A SUBSTRATE BY REFLECTION

CROSS-REFERENCE TO RELATED APPLICATION

The present application claims priority from Japanese application JP2011-007331 filed on Jan. 17, 2011, the content of which is hereby incorporated by reference into this application.

BACKGROUND OF THE INVENTION

1. Field of the Invention

The present invention relates to an interferometer, a demodulator, and a receiver-transmitter.

2. Description of the Related Art

In the field of optical transmission, as an optical modulation scheme suitable for increasing transmission capacity compared to an intensity modulation scheme in the related art, the utilization of a phase modulation system, such as differential binary phase shift keying (DPSK) or differential quadrature phase shift keying (DQPSK), has been studied.

A light signal modulated by the DPSK scheme, the DQPSK scheme, or the like is demodulated by a demodulator including at least one delay interferometer. As the implementation of the delay interferometer, there are primarily an implementation in which an optical waveguide is used and an implementation in which a space optical system using a bulk optical element is used. In the former, temperature control is needed, causing high power consumption. In the latter, low power consumption can be achieved. For this reason, the latter form is attracting attention as a dominant mounting form.

FIG. 1 is a plan view of a Michelson interferometer which is frequently used as a delay interferometer of space optical system. As shown in FIG. 1, in the Michelson interferometer, a half beam splitter 103 and light reflective elements 106 and 107 are disposed on a substrate 101. Light 102 to be measured branches into a branched light beam 104 and a branched light beam 105 by the half beam splitter 103. The branched light beams 104 and 105 are respectively reflected by the light reflective elements 106 and 107, become a reflected light beam 108 and a reflected light beam 109, and are guided to the half beam splitter 103 again. The reflected light beam 108 and the reflected light beam 109 are combined by the half beam splitter 103 and become interference light beams 110 and 111. The light reflective elements 106 and 107 are disposed such that the difference in the optical path length between the branched light beam 104 and the branched light beam 105 corresponds to one symbol of the modulated light beam signal. As the light reflective elements 106 and 107, a right angle prism, a corner cube prism, or the like is used.

In the Michelson interferometer, if the optical axes of a branched light beam before and after being reflected by the light reflective element overlap each other, then it becomes impossible to detect one of the two generated interference light beams, and furthermore, laser oscillation becomes unstable because a portion of light to be measured returns to a light source.

For this reason, as shown in FIG. 1, in general, the optical axes of a branched light beam before and after being reflected by the light reflective element differ in the direction parallel to the substrate (for example, see FIG. 3 of JP 2006-53049 A).

In JP 2005-525539 A, FIG. 10 shows an interferometer in which light emitted from a polarization branch element is moved in parallel in a direction at 45 degrees with respect to a plane, on which an optical component is disposed, by a retroreflective element, and is guided to the polarization branch element again.

In the interferometer of the related art, the size of an optical component, such as a half beam splitter, has to be increased depending on the interval between the optical axes of a branched light beam before and after being reflected by the light reflective element, making it difficult to reduce the size of the entire interferometer.

SUMMARY OF THE INVENTION

The invention has been made in consideration of the above-described problems, and an object of the present invention is to provide an interferometer, a demodulator, and a receiver-transmitter capable of achieving reduction in size.

For the sake of solving the above-described problems, an interferometer according to an aspect of the present invention includes a light branch element which branches light to be measured which travels substantially in parallel with a predetermined reference plane into a first branched light beam and a second branched light beam, and a light reflection means for reflecting the first branched light beam and the second branched light beam such that the optical axis of the first branched light beam and the optical axis of the second branched light beam are moved in parallel in a direction substantially perpendicular to the reference plane by reflection. The light branch element combines the first branched light beam and the second branched light beam reflected by the light reflection means to generate a first interference light beam and a second interference light beam.

The term "substantially parallel" or "substantially perpendicular" used herein includes the degree of deviation from parallel or perpendicular due to a manufacturing error. From another point of view, the term "substantially parallel" includes an angle within a range of a manufacturing error from parallel, and the term "substantially perpendicular" includes an angle within a range of a manufacturing error from perpendicular. In this specification, description will be provided as to a case where an interferometer is fixed onto a substrate as a reference plane using an adhesive.

Further, in another aspect of the present invention, the light reflection means may include a first light reflective element which reflects the first branched light beam, and a second light reflective element which reflects the second branched light beam.

Further, in still another aspect of the present invention, the light reflection means may be a single light reflective element which reflects the first branched light beam and the second branched light beam respectively.

Further, in still another aspect of the present invention, the first and second light reflective elements may respectively have two substantially orthogonal reflective surfaces and a fixed surface bonded and fixed to a predetermined substrate. The term "substantially orthogonal" includes the degree of deviation from orthogonal due to a manufacturing error. From another point of view, the term "substantially orthogonal" includes a case where surfaces cross each other at an angle within a range of a manufacturing error from a right angle.

The single light reflective element may have two substantially orthogonal reflective surfaces and a fixed surface bonded and fixed to a predetermined substrate.

A demodulator according to another aspect of the present invention includes a substrate, and a delay interferometer and a photodetector disposed on the substrate. The delay interferometer includes a light branch element which branches a modulated light beam subjected to differential phase shift keying which travels substantially in parallel with the substrate into a first branched light beam and a second branched light beam, and a light reflection means for reflecting the first branched light beam and the second branched light beam respectively such that the optical axis of the first branched light beam and the optical axis of the second branched light beam are moved in parallel in a direction substantially perpendicular to the substrate by reflection. The light reflection means reflects the first branched light beam and the second branched light beam respectively such that the difference in the optical path length between the first branched light beam and the second branched light beam becomes a length corresponding to one symbol of the modulated light beam. The light branch element combines the first branched light beam and the second branched light beam reflected by the light reflection means to generate a first interference light beam and a second interference light beam. The photodetector outputs an electrical signal which is in proportion to the difference in intensity between the first interference light beam and the second interference light beam generated by the delay interferometer.

Further, in still another aspect of the present invention, the demodulator may further include a light guiding element which guides the first interference light beam or the second interference light beam generated by the delay interferometer to the photodetector. The height of the light guiding element with respect to the substrate may be smaller than the height of the optical axis of each of the first branched light beam and the second branched light beam before being reflected by the light reflection means with respect to the substrate, and may be greater than the height of the optical axis of each of the first branched light beam and the second branched light beam after being reflected by the light reflection means with respect to the substrate.

A demodulator according to another aspect of the present invention includes a substrate, and a light separating means, first and second delay interferometers, and first and second photodetectors disposed on the substrate. The light separating means separates modulated light beam subjected to differential phase shift keying which travels substantially in parallel with the substrate into plural light beams. Each of the first and second delay interferometers includes a light branch element which branches one pieces of modulated light beam separated by the light separating means into a first branched light beam and a second branched light beam, and a light reflection means for reflecting the first branched light beam and the second branched light beam respectively such that the optical axis of the first branched light beam and the optical axis of the second branched light beam are moved in parallel in a direction substantially perpendicular to the substrate by reflection. The light reflection means reflects the first branched light beam and the second branched light beam respectively such that the difference in the optical path length between the first branched light beam and the second branched light beam becomes a length corresponding to one symbol of the modulated light beam. The light branch element combines the first branched light beam and the second branched light beam reflected by the light reflection means to generate a first interference light beam and a second interference light beam. The first photodetector outputs an electrical signal which is in proportion to the difference in intensity between the first interference light beam and the second interference light beam generated by one of the first and second delay interferometers. The second photodetector outputs an electrical signal which is in proportion to the difference in intensity between the first interference light beam and the second interference light beam generated by the other delay interferometer of the first and second delay interferometers.

Further, in still another aspect of the present invention, the demodulator may further include a light guiding element which guides the first or second interference light beam generated by the first or second delay interferometer to the first or second photodetector. The height of the light guiding element with respect to the substrate may be smaller than the height of the optical axis of each of the first branched light beam and the second branched light beam before being reflected by the light reflection means with respect to the substrate, and may be greater than the height of the optical axis of each of the first branched light beam and the second branched light beam reflected by the light reflection means with respect to the substrate.

Further, in still another aspect of the present invention, the demodulator may further include a base disposed on the substrate, and a light guiding element disposed on the base. The base may transmit modulated light beam subjected to differential phase shift keying which travels substantially in parallel with the substrate, and the light guiding element may guide the first or second interference light beam generated by the first or second delay interferometer to the first or second photodetector.

A receiver-transmitter according to another aspect of the present invention includes a substrate, and a delay interferometer and a photodetector disposed on the substrate. The delay interferometer includes a light branch element which branches modulated light beam subjected to differential phase shift keying which travels substantially in parallel with the substrate into a first branched light beam and a second branched light beam, and a light reflection means for reflecting the first branched light beam and the second branched light beam respectively such that the optical axis of the first branched light beam and the optical axis of the second branched light beam are moved in parallel in a direction substantially perpendicular to the substrate by reflection. The light reflection means reflects the first branched light beam and the second branched light beam respectively such that the difference in the optical path length between the first branched light beam and the second branched light beam becomes a length corresponding to one symbol of the modulated light beam. The light branch element combines the first branched light beam and the second branched light beam reflected by the light reflection means to generate a first interference light beam and a second interference light beam. The photodetector outputs an electrical signal which is in proportion to the difference in intensity between the first interference light beam and the second interference light beam generated by the delay interferometer.

A receiver-transmitter according to another aspect of the present invention includes a substrate, and a light separating means, first and second delay interferometers, and first and second photodetectors disposed on the substrate. The light separating means separates modulated light beam subjected to differential phase shift keying which travels substantially in parallel with the substrate into plural light beams. Each of the first and second delay interferometers includes a light branch element which branches one piece of the modulated light beam separated by the light separating means into a first branched light beam and a second branched light beam, and a light reflection means for reflecting the first branched light beam and the second branched light beam respectively such that the optical axis of the first branched light beam and the optical axis of the second branched light beam are moved in parallel in a direction substantially perpendicular to the substrate by reflection. The light reflection means reflects the first branched light beam and the second branched light beam respectively such that the difference in the optical path length between the first branched light beam and the second branched light beam becomes a length corresponding to one symbol of the modulated light beam. The light branch element combines the first branched light beam and the second branched light beam reflected by the light reflection means to generate a first interference light beam and a second interference light beam. The first photodetector outputs an electrical signal which is in proportion to the difference in intensity between the first interference light beam and the second interference light beam generated by one of the first and second delay interferometers. The second photodetector outputs an electrical signal which is in proportion to the difference in intensity between the first interference light beam and the second interference light beam generated by the other delay interferometer of the first and second delay interferometers.

According to the aspects of the present invention, it is possible to provide an interferometer, a demodulator, and a receiver-transmitter capable of achieving reduction in size compared to the related art.

DETAILED DESCRIPTION OF THE INVENTION

Figure 1:
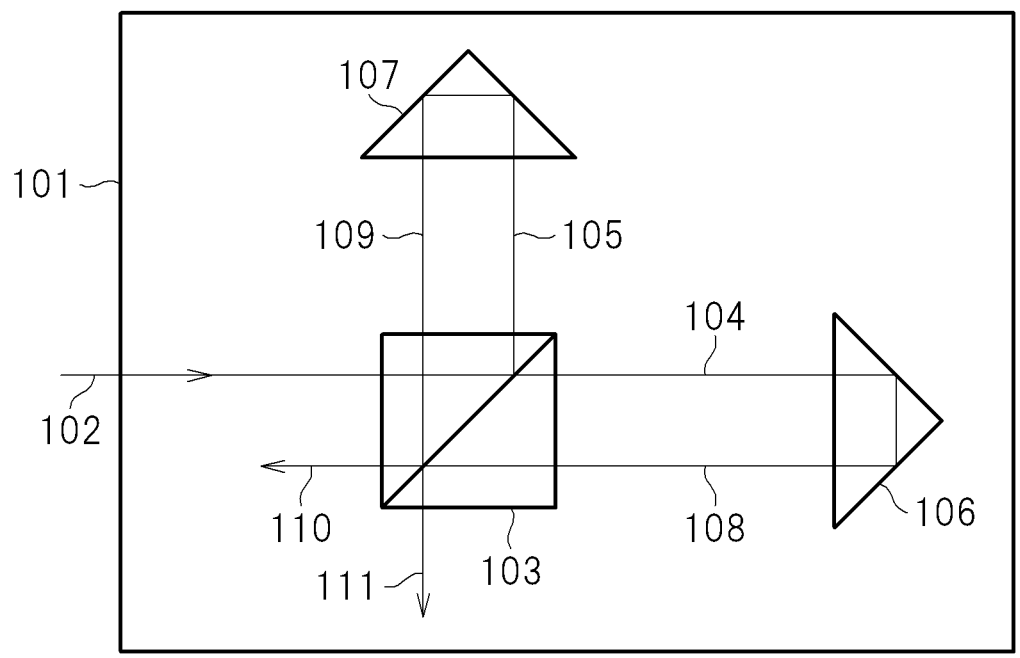
FIG. 1 is a plan view of a delay interferometer (Michelson interferometer) of the related art.

Hereinafter, the first to the fifth embodiments of the present invention will be described in detail with reference to the drawings. The components having the same functions are represented by the same reference numerals, and description thereof will not be provided.

First Embodiment

Figure 2A:
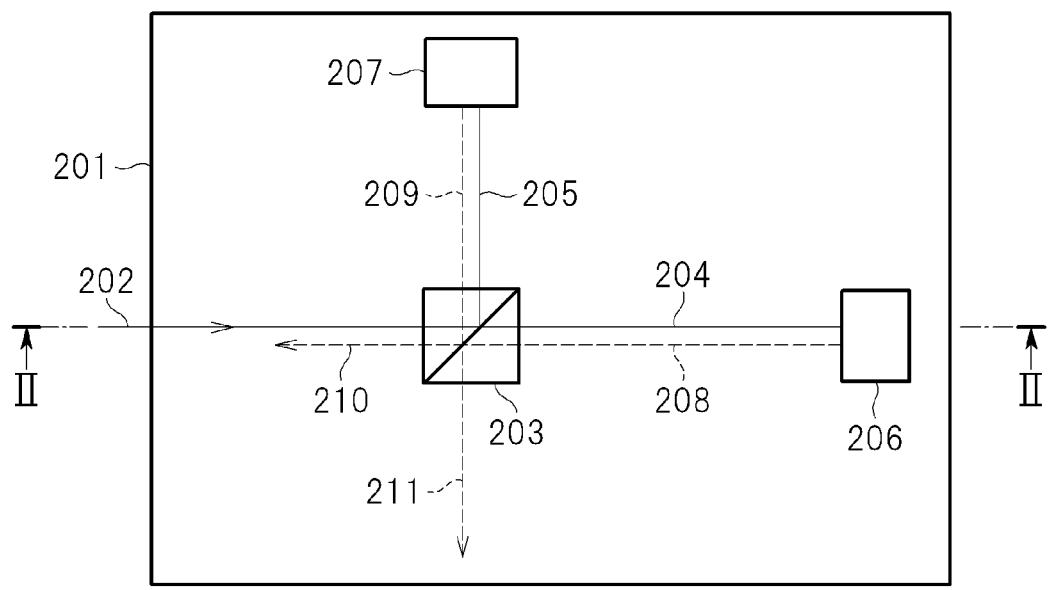
FIG. 2A is a plan view of a delay interferometer according to a first embodiment of the present invention.

FIG. 2A is a plan view of a delay interferometer according to a first embodiment. As shown in FIG. 2A, the delay interferometer of the first embodiment includes a half beam splitter 203 and pentagonal prisms 206 and 207. The half beam splitter 203 and pentagonal prisms 206 and 207 are disposed on a substrate 201.

The half beam splitter 203 branches light 202 to be measured (modulated light beam) which is incident on the half beam splitter 203 into a branched light beam 204 and a branched light beam 205 with an intensity ratio of 1:1. The light 202 travels substantially in parallel with the substrate 201. The pentagonal prism 206 reflects the branched light beam 204 such that the optical axis of the branched light beam 204 is moved in parallel in a direction substantially perpendicular to the substrate 201 by reflection (although in this case, the optical axis of the branched light beam 204 is moved in parallel in a direction away from the substrate 201, the optical axis of the branched light beam 204 may be moved in parallel in a direction close to the substrate 201). The branched light beam 204 reflected by the pentagonal prism 206 becomes a reflected light beam 208 and is incident on the half beam splitter 203 again. Similarly, the pentagonal prism 207 reflects the branched light beam 205 such that the optical axis of the branched light beam 205 is moved in parallel in a direction substantially perpendicular to the substrate 201 by reflection. The branched light beam 205 reflected by the pentagonal prism 207 becomes a reflected light beam 209 and is incident on the half beam splitter 203 again. The reflected light beam 208 and the reflected light beam 209 are combined by the half beam splitter 203 and become interference light beams 210 and 211.

The pentagonal prisms 206 and 207 are disposed such that the difference in the optical path length between the branched light beam 204 and the branched light beam 205 corresponds to one symbol of a modulated light signal. For example, when demodulating a light signal subjected to DQPSK modulation of 40 Gb/s, the difference in the optical path length of about 15 mm corresponding to one symbol of the signal is provided.

As described above, according to the first embodiment, the optical axis positions of the branched light beams 204 and 205 and the optical axis positions of the reflected light beams 208 and 209 differ in a direction substantially perpendicular to the substrate 201, making it possible to reduce the size of the delay interferometer compared to the related art.

Figure 2B:
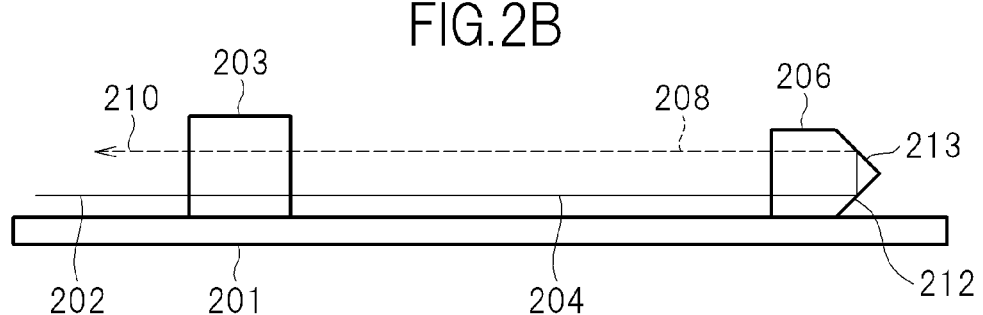
FIG. 2B is a sectional view of the delay interferometer shown in FIG. 2A taken along the line II-II.
Figure 3A:
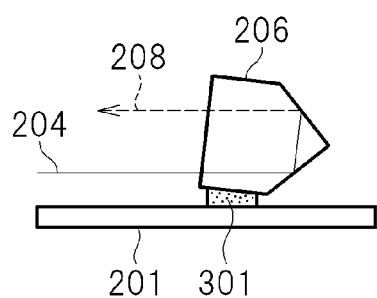
FIG. 3A is a diagram showing a fixed state of a pentagonal prism shown in FIG. 2B before adhesive contracts.
Figure 3B:
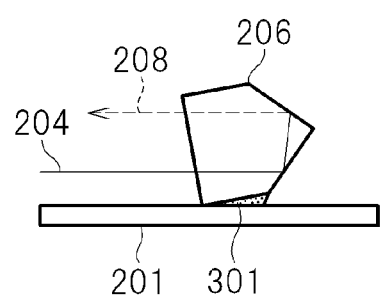
FIG. 3B is a diagram showing a fixed state of a pentagonal prism shown in FIG. 2B after adhesive contracts.

FIG. 2B is a sectional view of the delay interferometer shown in FIG. 2A taken along the line II-II (a sectional view when the delay interferometer shown in FIG. 2A is cut by a plane perpendicular to the substrate 201 and including the optical axis of light 202 to be measured). The branched light beam 204 is fully reflected by two substantially orthogonal reflective surfaces 212 and 213 of the pentagonal prism 206 and becomes the reflected light beam 208. In this way, the two reflective surfaces 212 and 213 are substantially orthogonal to each other, such that the tilt angle of the optical axis of the reflected light beam 208 substantially becomes equal to the tilt angle of the optical axis of the branched light beam 204 without depending on the installation angle of the pentagonal prism 206. For this reason, as shown in FIGS. 3A and 3B, when bonding and fixing the pentagonal prism 206 to the substrate 201, even if the tilt angle of the pentagonal prism 206 changes with contraction of an adhesive 301, the tilt angle of the reflected light beam 208 does not substantially change. The same is applied to the reflected light beam 209.

As described above, according to the delay interferometer of the first embodiment, it is possible to prevent degradation in an extinction ratio with contraction of the adhesive without using an expensive element, such as a corner cube prism.

Figure 4:
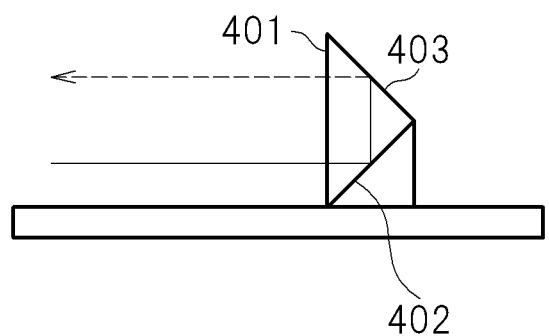
FIG. 4 is a diagram showing the shape of a quadrangular prism.

Instead of each of the pentagonal prisms 206 and 207, a quadrangular prism 401 having two substantially orthogonal reflective surfaces 402 and 403 shown in FIG. 4 may be used.

Also in this case, it is possible to make the optical axis of the branched light beam and the optical axis of the reflected light beam differ in a direction substantially perpendicular to the substrate. The quadrangular prism 401 shown in FIG. 4 has a depth smaller than the pentagonal prisms 206 and 207 shown in FIG. 2B. For this reason, if the quadrangular prism 401 is used for each of the pentagonal prisms 206 and 207, it becomes possible to further reduce the size of the delay interferometer.

Second Embodiment

Figure 5:
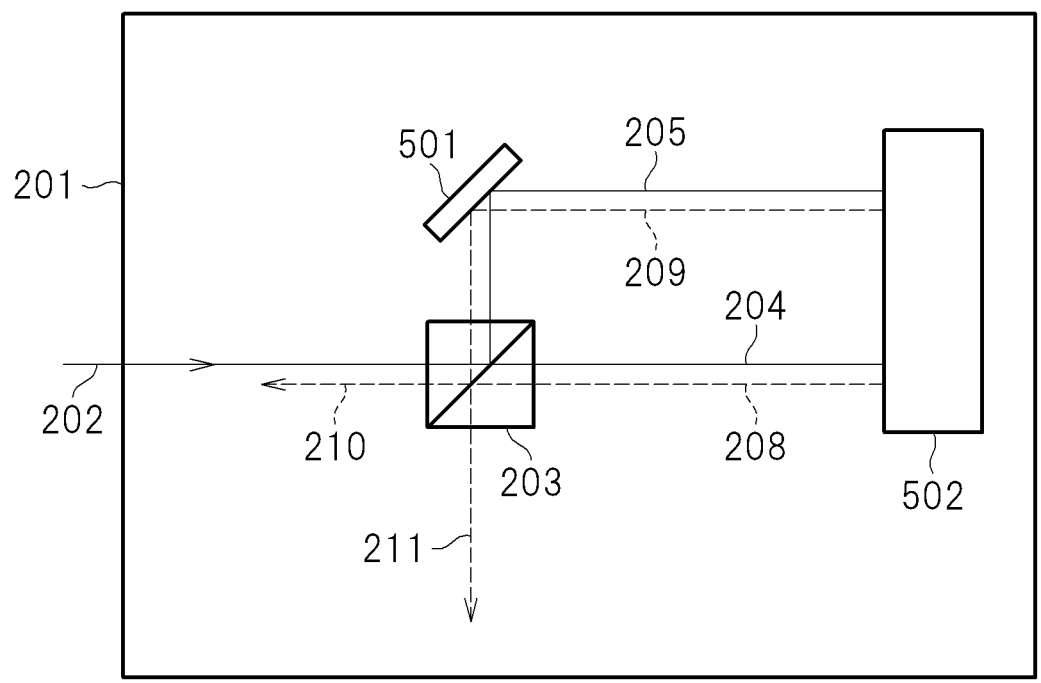
FIG. 5 is a plan view of a delay interferometer according to a second embodiment of the present invention.

FIG. 5 is a plan view of a delay interferometer according to a second embodiment. As shown in FIG. 5, the delay interferometer of the second embodiment includes a half beam splitter 203, a mirror 501, and a pentagonal prism 502. The half beam splitter 203, the mirror 501, and the pentagonal prism 502 are disposed on the substrate 201. The delay interferometer of the second embodiment is different from the delay interferometer of the first embodiment in that the two branched light beams 204 and 205 are reflected respectively by the single pentagonal prism 502.

The pentagonal prism 502 reflects the branched light beam 204 such that the optical axis of the branched light beam 204 is moved in parallel in a direction substantially perpendicular to the substrate 201 by reflection. The branched light beam 204 reflected by the pentagonal prism 502 becomes the reflected light beam 208 and is incident on the half beam splitter 203 again.

The mirror 501 reflects the branched light beam 205 to guide the branched light beam 205 to the pentagonal prism 502. The pentagonal prism 502 reflects the branched light beam 205 such that the optical axis of the branched light beam 205 is moved in parallel in a direction substantially perpendicular to the substrate 201 by reflection. The branched light beam 205 reflected by the pentagonal prism 502 becomes the reflected light beam 209, is guided to the mirror 501, and is incident on the half beam splitter 203 again. The mirror 501 and the pentagonal prism 502 are disposed such that the difference in the optical path length between the branched light beam 204 and the branched light beam 205 corresponds to one symbol of a modulated light signal.

With this configuration, the height of the optical axis of the reflected light beam 208 and the height of the optical axis of the reflected light beam 209 substantially coincide with each other without depending on dimensional tolerance of the pentagonal prism 502. For this reason, it becomes easy to combine the reflected light beam 208 and the reflected light beam 209.

As described above, according to the second embodiment, the optical axes of the branched light beams 204 and 205 and the optical axes of the reflected light beams 208 and 209 differ in a direction substantially perpendicular to the substrate 201, making it possible to reduce the size of the delay interferometer compared to the related art.

As in the first embodiment, instead of the pentagonal prism 502, the quadrangular prism 401 shown in FIG. 4 may be used.

Third Embodiment

Figure 6A:
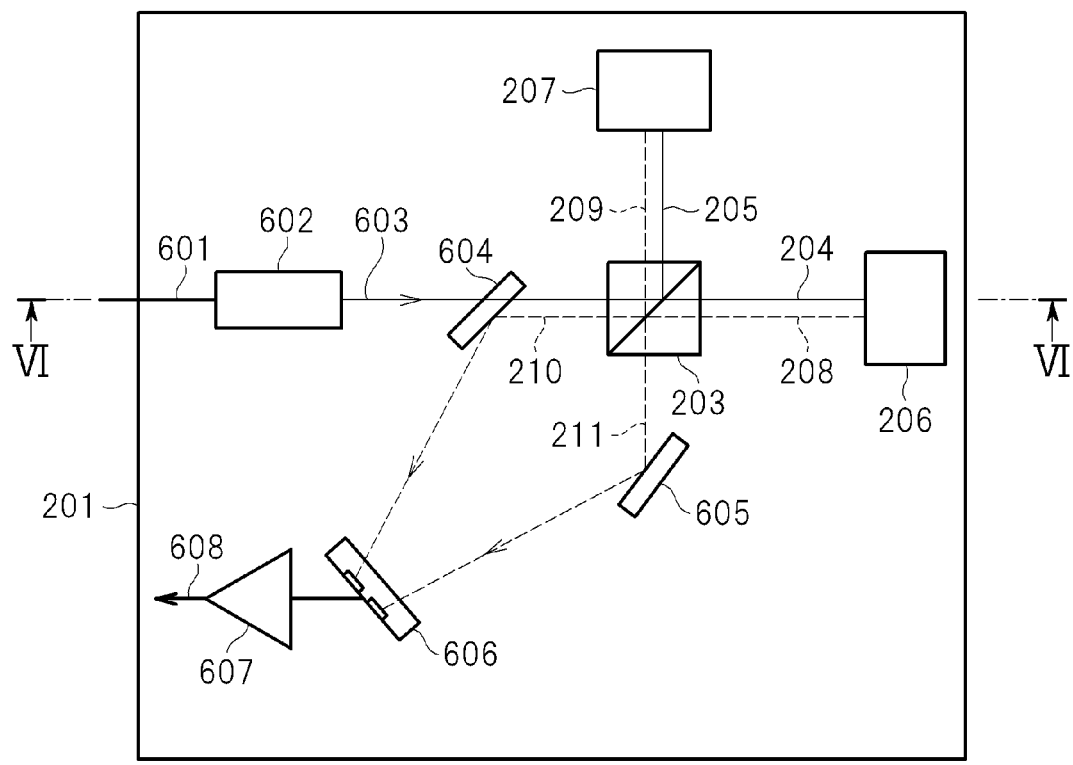
FIG. 6A is a plan view of a demodulator of a DPSK signal according to a third embodiment of the present invention.
Figure 6B:
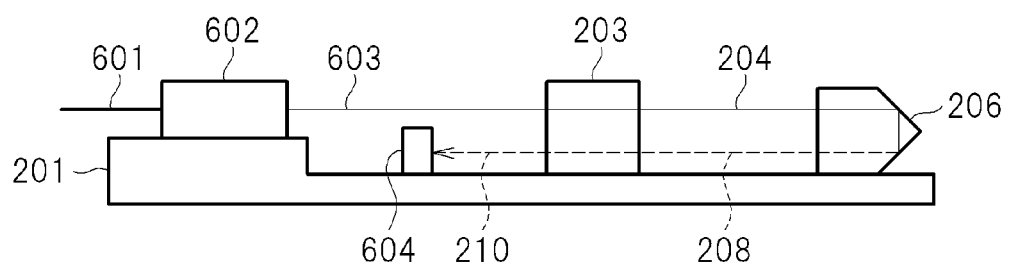
FIG. 6B is a sectional view of the demodulator shown in FIG. 6A taken along the line VI-VI.

FIG. 6A is a plan view of a demodulator of a DPSK signal according to a third embodiment. FIG. 6B is a sectional view of the demodulator shown in FIG. 6A taken along the line VI-VI (a sectional view when the demodulator shown in FIG. 6A is cut by a plane perpendicular to the substrate 201 and including the optical axis of modulated light beam 603). As shown in FIGS. 6A and 6B, the demodulator of the third embodiment includes the delay interferometer (the delay interferometer of the first embodiment) shown in FIGS. 2A and 2B, a collimator 602, mirrors 604 and 605, a photodetector 606, and a transimpedance amplifier 607. The collimator 602, the mirrors 604 and 605, the photodetector 606, and the transimpedance amplifier 607 are disposed on the substrate 201.

The modulated light beam 603 subjected to differential phase shift keying which propagates through an optical fiber 601 and is emitted substantially in parallel with the substrate 201 from the collimator 602 passes through the upper part of the mirror 604 and is incident on the half beam splitter 203. The half beam splitter 203 branches the modulated light beam 603 into the branched light beam 204 and the branched light beam 205 with an intensity ratio of 1:1. The pentagonal prism 206 reflects the branched light beam 204 such that the optical axis of the branched light beam 204 is moved in parallel in a direction substantially perpendicular to the substrate 201 and close to the substrate 201 by reflection. The branched light beam 204 reflected by the pentagonal prism 206 becomes the reflected light beam 208 and is incident on the half beam splitter 203 again. Similarly, the pentagonal prism 207 reflects the branched light beam 205 such that the optical axis of the branched light beam 205 is moved in parallel in a direction substantially perpendicular to the substrate 201 and close to the substrate 201 by reflection. The branched light beam 205 reflected by the pentagonal prism 207 becomes the reflected light beam 209 and is incident on the half beam splitter 203 again.

The pentagonal prisms 206 and 207 are disposed such that the difference in the optical path length between the branched light beam 204 and the branched light beam 205 corresponds to one symbol of a modulated light signal. As shown in FIG. 6B, the height of the optical axis of the reflected light beam 208 measured from the substrate 201 is smaller than the height of the mirror 604 (the same is applied to the reflected light beam 209).

The reflected light beam 208 and the reflected light beam 209 are combined by the half beam splitter 203 and become interference light beams 210 and 211. The interference light beams 210 and 211 are respectively guided to the photodetector 606 by the mirrors 604 and 605. The photodetector 606 outputs a current signal, which is in proportion to the difference in intensity between the interference light beams 210 and 211, to the transimpedance amplifier 607. The transimpedance amplifier 607 converts the current signal output from the photodetector 606 to a voltage signal 608. Although in this case, the mirror 604 is used as a light guiding element, any element may be used insofar as the element has a function of guiding the interference light beam 210 to the detector. A prism, a diffraction grating, or the like may also be used.

As described above, according to the third Embodiment, the optical axis positions of the branched light beams 204 and 205 and the optical axis positions of the reflected light beams 208 and 209 differ in a direction substantially perpendicular to the substrate 201, making it possible to reduce the size of the demodulator compared to the related art.

Fourth Embodiment

Figure 7:
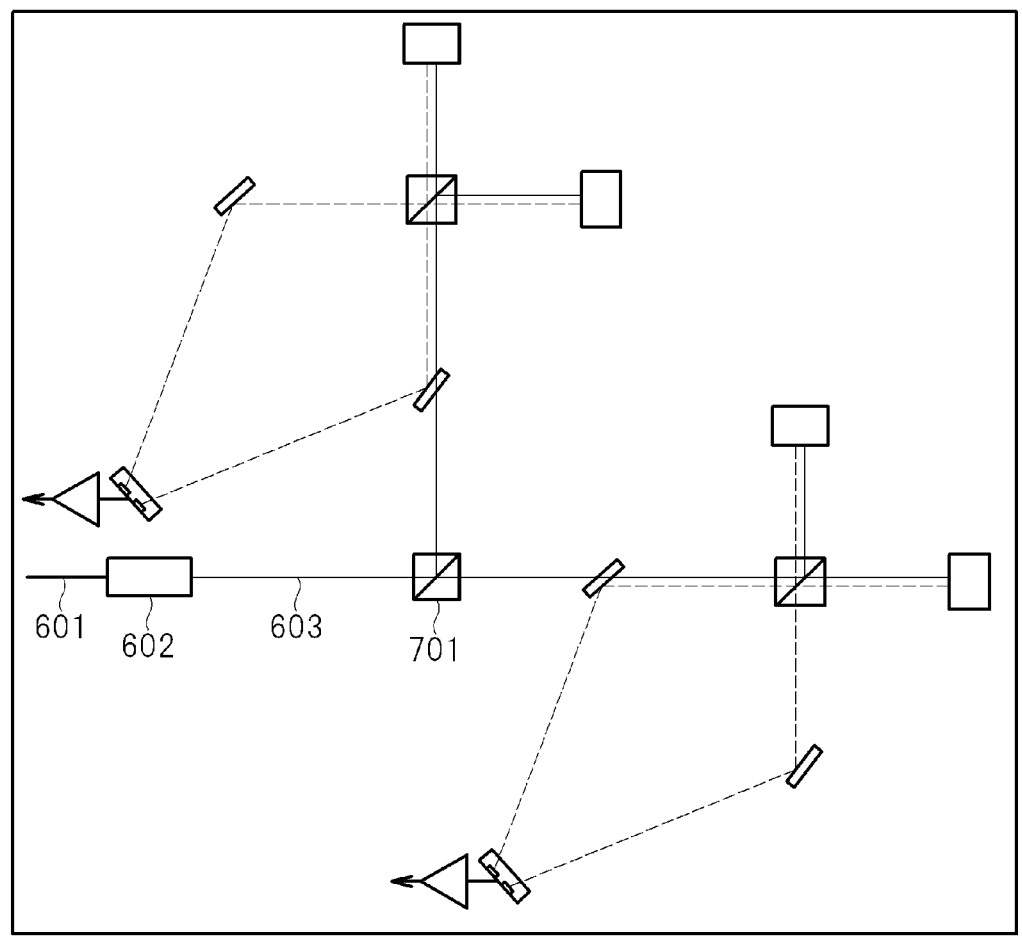
FIG. 7 is a plan view of a demodulator of a DQPSK signal according to a fourth embodiment of the present invention.

FIG. 7 is a plan view of a demodulator of a DQPSK signal according to a fourth embodiment of the present invention. As shown in FIG. 7, the demodulator of the fourth embodiment includes two demodulators having the same structure as the demodulator (the demodulator of a DPSK signal according to the third embodiment) shown in FIGS. 6A and 6B and a half beam splitter 701.

The modulated light beam 603 subjected to differential phase shift keying which propagates through the optical fiber 601 and is emitted substantially in parallel with the substrate from the collimator 602 is incident on the half beam splitter 701. The half beam splitter 701 branches the modulated light beam 603 into two the modulated light beams with an intensity ratio of 1:1. The branched modulated light beams are respectively demodulated by the demodulators having the same structure as the demodulator of a DPSK signal according to the third embodiment, such that two output signals are generated.

Figure 8A:
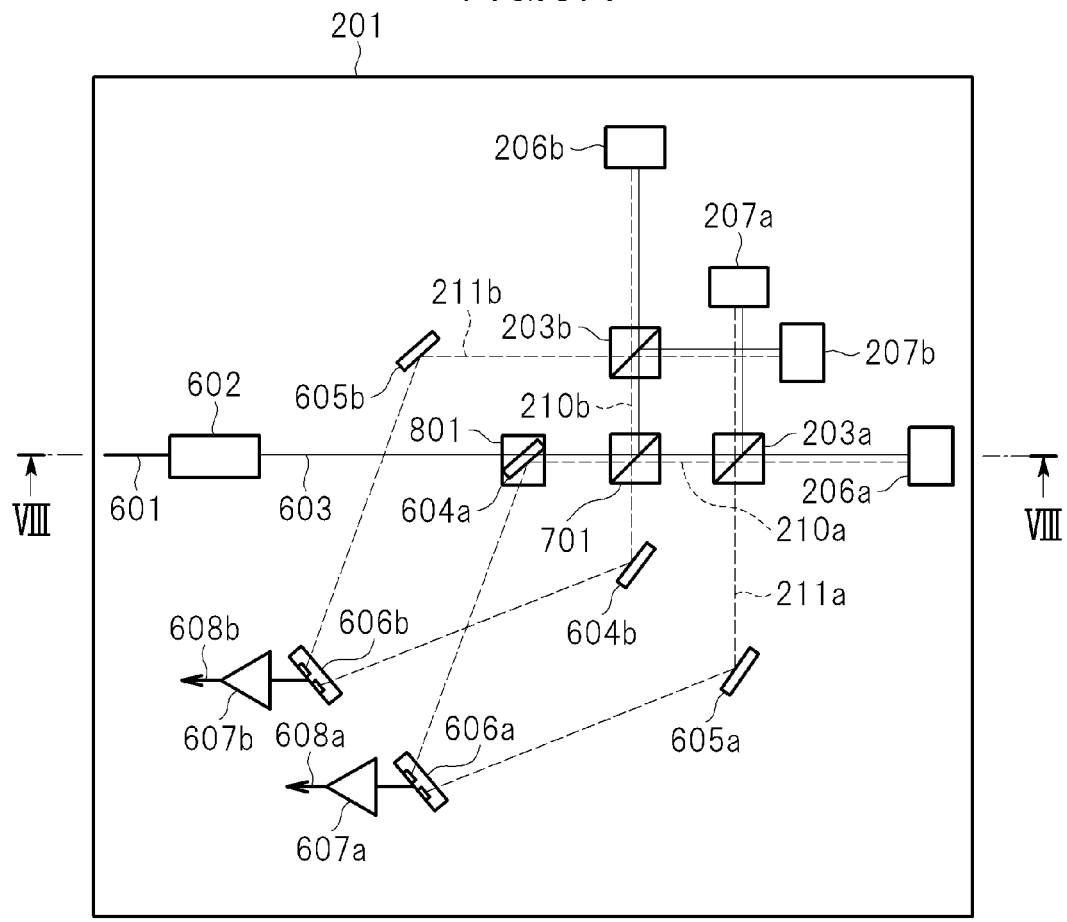
FIG. 8A is a diagram showing a configuration when the demodulator shown in FIG. 7 is further reduced in size.
Figure 8B:
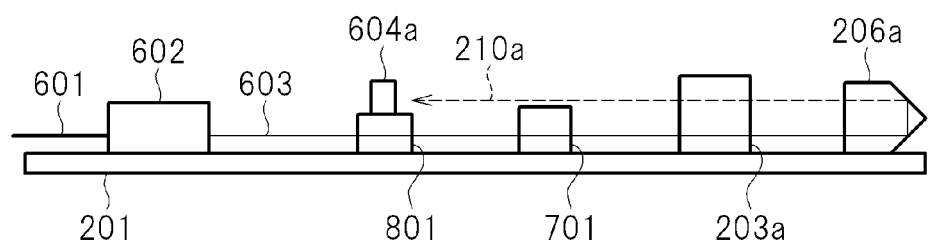
FIG. 8B is a sectional view of the demodulator shown in FIG. 8A taken along the line VIII-VIII.

FIG. 8A is a diagram showing a configuration when the demodulator shown in FIG. 7 is further reduced in size. FIG. 8B is a sectional view of the demodulator shown in FIG. 8A taken along the line VIII-VIII (a sectional view when the demodulator shown in FIG. 8A is cut by a plane perpendicular to the substrate 201 and including the optical axis of the modulated light beam 603).

The modulated light beam 603 subjected to differential phase shift keying which propagates through the optical fiber 601 and is emitted substantially in parallel with the substrate 201 from the collimator 602 transmits through a mirror base 801 made of a transparent material and is incident on the half beam splitter 701. The half beam splitter 701 branches the modulated light beam 603 into two the modulated light beams with an intensity ratio of 1:1.

One modulated light beam branched by the half beam splitter 701 is incident on a delay interferometer (which is the same as the delay interferometer shown in FIGS. 2A and 2B) having a half beam splitter 203a and pentagonal prisms 206a and 207a, and interference light beams 210a and 211a are generated. Similarly, the other modulated light beam branched by the half beam splitter 701 is incident on a delay interferometer (which is the same as the delay interferometer shown in FIGS. 2A and 2B) having a half beam splitter 203b and pentagonal prisms 206b and 207b, and interference light beams 210b and 211b are generated.

As shown in FIG. 8B, the pentagonal prisms 206a and 207a respectively reflect two branched light beams branched by the half beam splitter 203a such that the optical axes of the two branched light beams are moved in parallel in a direction substantially perpendicular to the substrate 201 and away from the substrate 201 by reflection. Similarly, the pentagonal prisms 206b and 207b respectively reflect two branched light beams branched by the half beam splitter 203b such that the optical axes of the two branched light beams are moved in parallel in a direction substantially perpendicular to the substrate 201 and away from the substrate 201 by reflection.

As shown in FIG. 8B, the height of the optical axis of the interference light beam 210a measured from the substrate 201 is greater than the height of the mirror base 801 and the half beam splitter 701 (the same is applied to the interference light beam 210b). The interference light beam 210a passes through the upper part of the half beam splitter 701 and is then guided to a photodetector 606a by a mirror 604a provided on the mirror base 801. The interference light beam 211a is guided to the photodetector 606a by a mirror 605a. The photodetector 606a outputs a current signal, which is in proportion to the difference in intensity between the interference light beams 210a and 211a, to a transimpedance amplifier 607a. The transimpedance amplifier 607a converts the current signal output from the photodetector 606a to a voltage signal 608a.

Similarly, the interference light beam 210b passes through the upper part of the half beam splitter 701 and is then guided to a photodetector 606b by a mirror 604b. The interference light beam 211b is guided to the photodetector 606b by a mirror 605b. The photodetector 606b outputs a current signal, which is in proportion to the difference in intensity between the interference light beams 210b and 211b, to a transimpedance amplifier 607b. The transimpedance amplifier 607b converts the current signal output from the photodetector 606b to a voltage signal 608b.

According to the configuration shown in FIGS. 8A and 8B, it is possible to decrease the distance between the half beam splitter 701 and the half beam splitter 203a and the distance between the half beam splitter 701 and the half beam splitter 203b compared to the configuration shown in FIG. 7, making it possible to further reduce the size of the demodulator.

Fifth Embodiment

Figure 9:
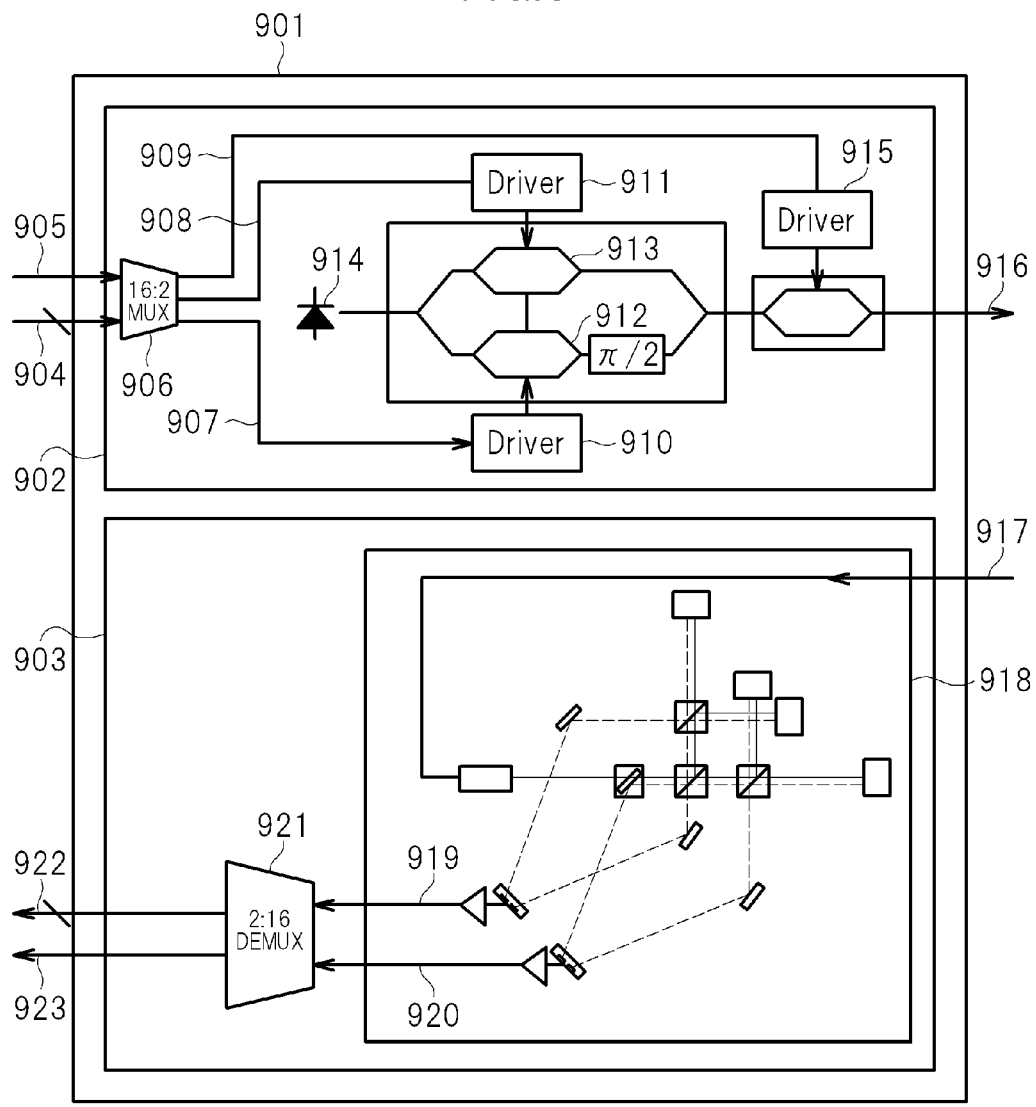
FIG. 9 is a plan view of a receiver-transmitter of a DQPSK signal according to a fifth embodiment of the present invention.

FIG. 9 is a plan view of a receiver-transmitter 901 of a DQPSK signal according to a fifth embodiment. As shown in FIG. 9, the receiver-transmitter 901 has a transmitter 902 and a receiver 903. In the transmitter 902, a multiplexer 906 generates data modulation signals 907 and 908 and a clock signal 909 from plural data signals 904 and a clock signal 905. Drivers 910 and 911 respectively control phase modulators 912 and 913 on the basis of the data modulation signals 907 and 908 to perform differential phase shift keying on light emitted from a laser light source 914. A driver 915 further applies pulsed modulation on light subjected to differential phase shift keying on the basis of the clock signal 909. Modulated light beam 916 modulated in the above-described manner is transmitted from the transmitter 902.

Modulated light beam 917 subjected to differential phase shift keying is input to the receiver 903. The modulated light beam 917 is demodulated by a demodulator 918 which is the same as the demodulator (the demodulator of a DQPSK signal according to the fourth embodiment) shown in FIGS. 8A and 8B, and two voltage signals 919 and 920 are generated. The voltage signals 919 and 920 are separated into plural data signals 922 and a clock signal 923 in a demultiplexer 921.

As described above, according to the fifth embodiment, since the demodulator 918 which is the same as the demodulator of the fourth embodiment is used, it becomes possible to reduce the size of the receiver-transmitter compared to the related art.

Modifications

The invention is not limited to the foregoing embodiments, and various modifications may be made. The configuration which has been described in the foregoing embodiments may be substituted with the substantially same configuration, a configuration having the same functional effects, or a configuration capable of achieving the same object.

For example, although in the foregoing embodiments, a demodulator or a receiver-transmitter including one or two delay interferometers has been illustrated, the invention can be applied to a demodulator or a receiver-transmitter including more delay interferometers.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A demodulator comprising:
    a substrate;
    a collimator emitting a modulated light beam subjected to differential phase shift keying;
    a delay interferometer;
    a photodetector; and
    a light guiding element,
    wherein the collimator is disposed on a bump of the substrate and the delay interferometer and the photodetector are disposed on a flat region of the substrate,
    wherein the delay interferometer includes:
        a light branch element which branches the modulated light beam subjected to differential phase shift keying which travels substantially in parallel with the substrate into a first branched light beam and a second branched light beam, and
        a light reflection means for reflecting the first branched light beam and the second branched light beam respectively such that the optical axis of the first branched light beam and the optical axis of the second branched light beam are moved in parallel in a direction substantially perpendicular to the substrate by reflection,
    wherein the light reflection means reflects the first branched light beam and the second branched light beam respectively such that the difference in the optical path length between the first branched light beam and the second branched light beam becomes a length corresponding to one symbol of the modulated light signal,
    wherein the light branch element combines the first branched light beam and the second branched light beam reflected by the light reflection means to generate a first interference light beam and a second interference light beam,
    wherein the photodetector outputs an electrical signal which is in proportion to the difference in intensity between the first interference light beam and the second interference light beam generated by the delay interferometer,
    wherein the light guiding element guides the first interference light beam or the second interference light beam generated by the delay interferometer to the photodetector, and
    wherein the height of the light guiding element with respect to the substrate is smaller than the height of the optical axis of each of the first branched light beam and the second branched light beam before being reflected by the light reflection means with respect to the substrate, and is greater than the height of the optical axis of each of the first branched light beam and the second branched light beam after being reflected by the light reflection means with respect to the substrate.

2. A demodulator comprising:
    a substrate;
    a collimator emitting a modulated light beam subjected to differential phase shift keying;
    a light separating means;
    first and second delay interferometers;
    first and second photodetectors; and
    a light guiding element,
    wherein the collimator is disposed on a bump of the substrate and the light separating means, the first and second delay interferometers, and the first and second photodetectors are disposed on a flat region of the substrate,
    wherein the light separating means separates a modulated light beam subjected to differential phase shift keying which travels substantially in parallel with the substrate into a plurality of light beams,
    wherein each of the first and second delay interferometers includes:
        a light branch element which branches one modulated light beam separated by the light separating means into a first branched light beam and a second branched light beam, and
        a light reflection means for reflecting the first branched light beam and the second branched light beam respectively such that the optical axis of the first branched light beam and the optical axis of the second branched light beam are moved in parallel in a direction substantially perpendicular to the substrate by reflection,
    wherein the light reflection means reflects the first branched light beam and the second branched light beam respectively such that the difference in the optical path length between the first branched light beam and the second branched light beam becomes a length corresponding to one symbol of the modulated light beam,
    wherein the light branch element combines the first branched light beam and the second branched light beam reflected by the light reflection means to generate a first interference light beam and a second interference light beam,
    wherein the first photodetector outputs an electrical signal which is in proportion to the difference in intensity between the first interference light beam and the second interference light beam generated by one of the first and second delay interferometers,
    wherein the second photodetector outputs an electrical signal which is in proportion to the difference in intensity between the first interference light beam and the second interference light beam generated by the other delay interferometer of the first and second delay interferometers,
    wherein the light guiding element guides the first or second interference light beam generated by the first or second delay interferometer to the first or second photodetector, and
    wherein the height of the light guiding element with respect to the substrate is smaller than the height of the optical axis of each of the first branched light beam and the second branched light beam before being reflected by the light reflection means with respect to the substrate, and is greater than the height of each of the first branched light beam and the second branched light beam reflected by the light reflection means with respect to the substrate.

3. A demodulator comprising:
    a substrate; and
    a light separating means, first and second delay interferometers, first and second photodetectors, a base and a light guiding element, wherein the light separating means, the first and second delay interferometers, the first and second photodetectors and the base are disposed on the substrate,
    wherein the light separating means separates a modulated light beam subjected to differential phase shift keying which travels substantially in parallel with the substrate into a plurality of light beams,
    wherein each of the first and second delay interferometers includes:

a light branch element which branches one modulated light beam separated by the light separating means into a first branched light beam and a second branched light beam, and a light reflection means for reflecting the first branched light beam and the second branched light beam respectively such that the optical axis of the first branched light beam and the optical axis of the second branched light beam are moved in parallel in a direction substantially perpendicular to the substrate by reflection, wherein the light reflection means reflects the first branched light beam and the second branched light beam respectively such that the difference in the optical path length between the first branched light beam and the second branched light beam becomes a length corresponding to one symbol of the modulated light beam, wherein the light branch element combines the first branched light beam and the second branched light beam reflected by the light reflection means to generate a first interference light beam and a second interference light beam, wherein the first photodetector outputs an electrical signal which is in proportion to the difference in intensity between the first interference light beam and the second interference light beam generated by one of the first and second delay interferometers, and wherein the second photodetector outputs an electrical signal which is in proportion to the difference in intensity between the first interference light beam and the second interference light beam generated by the other delay interferometer of the first and second delay interferometers, wherein the light guiding element is disposed on the base, wherein modulated light beam subjected to differential phase shift keying which travels substantially in parallel with the substrate passes below an upper surface of the base, and wherein the light guiding element guides the first or second interference light beam generated by the first or second delay interferometer to the first or second photodetector.

* * * * *